United States Patent

Laufenberg et al.

[11] Patent Number: 5,888,311
[45] Date of Patent: Mar. 30, 1999

[54] PROCESS FOR CLEANING FACTORY EQUIPMENT WITH INTEGRATED PRERINSE

[75] Inventors: Alfred Laufenberg, Dormagen; Dietmar Rossner, Hilden; Ralf Krack, Duesseldorf, all of Germany

[73] Assignee: Henkel-Ecolab GmbH & Co. OHG, Duesseldorf, Germany

[21] Appl. No.: 983,567

[22] PCT Filed: Jun. 24, 1996

[86] PCT No.: PCT/EP96/02752

§ 371 Date: May 28, 1998

§ 102(e) Date: May 28, 1998

[87] PCT Pub. No.: WO97/02099

PCT Pub. Date: Jan. 23, 1997

[30] Foreign Application Priority Data

Jul. 3, 1995 [DE] Germany .......... 195 24 211.4

[51] Int. Cl.$^6$ .............. B08B 3/04; B08B 9/00; B08B 9/093; B08B 7/04
[52] U.S. Cl. .......... 134/10; 134/22.1; 134/22.12; 134/22.18; 134/26
[58] Field of Search .......... 134/10, 22.1, 22.18, 134/22.12, 26

[56] References Cited

U.S. PATENT DOCUMENTS 2,835,261  5/1958  Wogan ............................ 134/56
4,861,385  8/1989  Yagishita ......................... 134/10

FOREIGN PATENT DOCUMENTS 30 02 100  7/1981  Germany .
40 40 944  7/1992  Germany .

*Primary Examiner*—Zeinab El-Arini
*Attorney, Agent, or Firm*—Ernest G. Szoke; Wayne C. Jaeschke; Real J. Grandmaison

[57] ABSTRACT

A process for cleaning processing equipment for beverages or foods including the steps of (a) pumping a cleaning solution from its holding tank through the processing equipment in the absence of a pre-rinsing step, (b) collecting a first portion of the cleaning solution returning from the processing equipment into a recycling tank, (c) returning to the holding tank for the cleaning solution the main portion of the cleaning solution flowing through the processing equipment, (d) subjecting the first portion of the cleaning solution collected into the recycling tank to a separation process to provide a soil-rich concentrate and a low soil content regenerate, (e) transferring the regenerate to the holding tank for the cleaning solution, and (f) disposing of the soil-rich concentrate as waste.

5 Claims, No Drawings

PROCESS FOR CLEANING FACTORY EQUIPMENT WITH INTEGRATED PRERINSE

This is a national stage application of PCT/EP 96/02752 filed Jun. 24, 1996 published as WO97/02099 Jan. 23, 1997.

BACKGROUND OF THE INVENTION

1. Field of the Invention

This invention relates to a new process sequence for cleaning processing equipment for beverages or foods in the corresponding processing plants. Examples of such processing plants include milk-processing factories, breweries, factories for processing fruit juices and for the manufacture of preserved and deep-frozen foods. The new process affords economic and ecological advantages through an integrated recycling step.

2. Discussion of Related Art

The so-called cleaning-in-place (CIP) concept has been successfully adopted for the cleaning of such plants. This means that the equipment designed to receive and process foods or beverages is provided with its own installed cleaning system. The cleaning system generally consists of several storage containers for cleaning solution, for prerinse and post-rinse solutions and optionally for soiled water flowing back. The individual cleaning solutions are delivered to the equipment to be cleaned through valve-controlled pipes and are optionally pump-circulated up to the end of the cleaning process. The cleaning solutions themselves may either be strongly acidic or strongly alkaline, i.e. may have pH values of, for example, about 0 to about 2 or in the range from about 12 to about 14. Besides the acids or alkalis, for example sodium hydroxide, the cleaning solutions optionally contain other additives such as, for example, surfactants, defoamers, complexing agents and disinfectants. "Neutral" cleaners with a pH value in the range from about 4 to about 9 are also possible.

In the cleaning-in-place of processing equipment in the food- or beverage-processing industry, the emptied equipment is normally prerinsed with water to remove residues of product. The water soiled with the product residues is normally discharged into the main drains and is therefore lost to the rest of the process. Accordingly, the prerinse step costs water, time and also energy.

The prerinse step is normally followed by the actual cleaning phase in which the cleaning solution is pumped from its holding tank through the equipment to be cleaned and back into the holding tank. The cleaning solution circulates until the required cleaning effect is achieved. It becomes increasingly polluted by the soil removed from the processing equipment and, after a short time, has to be discarded or treated. In recent years, regeneration systems such as, for example, Alka Save or Niro Filtration Systems have been brought onto the market for treating the soiled cleaning solution. In these regeneration processes, soil components are removed from the cleaning solution so that its useful life is extended. However, this does not affect the actual cleaning process consisting of the prerinse, cleaning and post-rinse steps.

The actual cleaning phase is followed by rinsing with water to remove all traces of the cleaning solution from the processing equipment. The rinsing water accumulating contains residues of the cleaning solution and soil residues and, to save water, may be used as the prerinse solution as described in the foregoing. However, the tendency to reuse this water is on the decline for several reasons. There is a danger of microorganisms adapting to the cleaning and disinfecting chemicals present in the rinsing water. The germs present in the rinsing solution and in the corresponding storage tank proliferate and soil components accumulate. Accordingly, germs and soil are additionally introduced into the equipment to be cleaned in the prerinse step. This adversely affects the starting situation for cleaning and disinfection. If an acidic cleaning solution is used, the pH value of the rinsing solution is often around the isoelectric point of the proteinaceous soil to be removed. This makes cleaning very difficult.

The problem addressed by the present invention was to improve the cleaning-in-place process in such a way that the water, time and energy demands would be reduced and, in addition, the soil removed from the processing equipment would accumulate in a concentrated form so that it would be easier to treat or dispose of as waste.

DESCRIPTION OF THE INVENTION

This problem has been solved by a process for cleaning processing equipment for beverages or foods which is characterized in that a) the cleaning solution is pumped from its holding tank through the processing equipment without prerinsing, b) a first part (=first runnings) of the cleaning solution returning from the processing equipment is collected in a recycling tank, c) the main part of the cleaning solution flowing back after the first part is returned to the holding tank for cleaning solution, d) the first runnings collected in the recycling tank are subjected to a separation process by which they are separated into a soil-rich concentrate and a low-soil regenerate and e) the regenerate is transferred to the holding tank for the cleaning solution and the soil-rich concentrate is disposed of as waste.

In contrast to the existing process, therefore, there is no separate prerinse, the cleaning solution being pumped into the equipment to be cleaned without prerinsing in step a). It is advisable to empty the processing equipment beforehand. The first part of the cleaning solution returning from the processing equipment, referred to herein as the first runnings, is still very heavily soiled with product residues from the processing equipment. This is reflected in the fact that the cleaning solution has a greatly increased chemical oxygen demand (COD) through the presence of product residues. By contrast, the cleaning solution returning after the first runnings has a distinctly reduced COD because it is free from the product residues and only contains the detached soil.

The core of the invention in its first step consists in separately collecting the first runnings soiled with product residues and having an elevated COD value and delivering them to a recycling tank. How much of the total volume of the circulating cleaning solution is made up by the first runnings in each individual case is specific to the processing equipment to be cleaned and must first be experimentally determined for each plant by analysis of the COD value. The high-COD first runnings collected in a recycling tank in step b) normally make up about 1 to about 25% of the total cleaning solution used.

The main part of the cleaning solution flowing back after the first runnings is delivered to the holding tank for the cleaning solution and is optionally circulated until the required cleaning effect is achieved.

Step d) is the second step crucial to the invention. In this step, the product-soiled high-COD first runnings collected in the recycling tank are subjected to a separation process. In this separation process, the first runnings are separated into a soil-rich concentrate and a low-soil regenerate which still has largely the acid or alkali content of the cleaning solution. The separation process used is preferably a membrane process and, more particularly, microfiltration, ultrafiltration or nanofiltration. Nanofiltration is particularly preferred. In the case of the widely used alkaline cleaning solutions, a ceramic membrane or an alkali-stable organic polymer membrane (for example of the type marketed by Membrane Products Kyriat Weizmann of Rehovot, Israel) may be used for the nanofiltration process.

The extent to which the first runnings collected in the recycling tank can be separated by such a membrane process into a reusable regenerate (permeate) and a retentate for disposal as waste will depend on the nature and degree of soiling by food or beverage residues. In experimental laboratory tests with artificially prepared soiled first runnings using such beverages as, for example, milk or beer, it was found that around 60 to 95% by volume of the first runnings could be recovered as regenerate under simulated practical conditions. The process as a whole is more economical, the larger the amount of regenerate obtainable.

The regenerate, which still largely contains the acid in the case of acidic cleaning solutions and the alkalinity in the case of alkaline cleaning solutions, is transferred to the holding tank for the cleaning solution. However, since part of the acid or alkalinity is lost through chemical consumption or retention in the retentate and since, in addition, additives such as, for example, surfactants or defoamers are retained in the retentate, the active chemicals consumed or removed have to be periodically replaced. The simplest way of doing this is to use the electrical conductivity of the cleaning solution as the control parameter for replacement and automatically to introduce an active-substance concentrate from a storage container whenever the concentration level falls below a preset minimum value.

The soil-rich concentrate, which may have a solids content of about 25 to 35% by weight, is preferably disposed of separately, for example by burning or by biological degradation, for example in a digesting tower. The concentrate could of course also be added to the normal process wastewater although this is less preferable for ecological reasons.

There is generally no need to adjust the temperature of the soil-containing cleaning solution collected in the recycling tank to a certain value for the separation process. Instead, the temperature maintained in the cleaning circuit of the particular processing equipment may be retained. In the case of milk-processing equipment, this temperature is normally well above room temperature and may be, for example, in the range from about 50° to about 80° C.; in the cleaning of milk heaters, it may even exceed 90° C. By contrast, in the cleaning of brewing equipment, temperatures around room temperature are sufficient. In order to avoid additional energy consumption, the first runnings collected in the recycling tank are subjected to the separation process at their particular temperature.

Even though the cleaning solution is largely regenerated by the above-described process, a very small percentage by volume is discharged as soil-containing retentate. The resulting loss is preferably made up during the next step of the cleaning process as a whole. After the actual cleaning phase and the return of the cleaning solution to its holding tank, the processing equipment is rinsed with fresh water to flush out residues of the cleaning solution. The first part of the rinsing water returning from the processing equipment thus contains the main part of the cleaning solution remaining in the processing equipment. Now, such a large percentage of the first rinsing water flowing back is returned to the holding tank for cleaning solution that the proportion by volume lost through removal of the soil is replaced. Since this first part of the rinsing water still contains active ingredients of the cleaning solution, this procedure is more economical than replacing the lost volume with fresh cleaning solution.

Accordingly, the process according to the invention has the following advantages over existing processes:

There is no need for separate prerinsing of the processing equipment so that no rinsing water for disposal accumulates and, in addition, time and energy are saved.

Only a small proportion of the actual cleaning solution ("first runnings") is subjected to a separation process so that the separation unit can have relatively small dimensions and can be operated with a reduced energy consumption than if the entire cleaning solution were to be regenerated. The first part of the rinsing water containing residues of the cleaning solution is added to the cleaning solution so that the active substances can be reused. The rest of the rinsing water is only lightly soiled and may safely be discharged into the main drains or, if desired, may even be further treated.

There is no need to store the rinsing water for subsequent use as a prerinse solution so that there is no danger of microorganisms accumulating and adapting to the active ingredients.

Wastewater pollution is distinctly reduced by the direct disposal of the heavily soil-laden retentate from the separation of the first runnings, for example by burning or digestion in a digestion tower.

In addition, the danger of microbiological contamination is reduced in relation to the conventional process where the post-rinse solution is used for prerinsing in the next step. Compared with earlier processes which directly use fresh water for prerinsing the processing equipment, the process according to the invention leads to complete saving of the prerinsing water.

The useful life of the cleaning solution can be lengthened if, during prolonged stoppages, for example at weekends, the entire cleaning solution is subjected to the separation process of which the capacity during normal working hours only has to suffice to separate the first runnings.

Separation step d) is explained by way of example in the following:

The effect of nanofiltration on simulated first runnings of cleaning solutions was investigated in laboratory tests. A commercially obtainable nanofiltration membrane based on organic polymers (supplier: Membrane Products Kyriat Weizmann, Rehovot, Israel) was used for this purpose.

In a first test, first runnings from the cleaning of a milk heater were simulated. To this end, 11.6 kg of whole-milk powder (26% by weight fat in dry matter) and 3 kg of 50% by weight sodium hydroxide were made up with water to 100 kg. The resulting solution was saponified with stirring for 4 hours at 65° C. and then diluted with water in a ratio by volume of 1:1. The hydroxide content was then determined by titration and adjusted to an Na(OH) content of 1.5% by weight by addition of sodium hydroxide.

The solution was filtered through the nanofiltration membrane at a temperature of 60° C. Over the first 25 hours, the membrane flow fell from 22 liters per hour per square meter ($L/hm^2$) to 10 $L/hm^2$ while the COD of the retentate increased from 80,000 to 150,000; the permeate had a COD of 10,000 after 25 hours. Fresh solution was added on the retentate side so that the COD of the retentate decreased and membrane flow increased. The test was continued for another 150 hours, fresh solution being added on the retentate side four times after an interval of 25 hours. After a total running time of 175 hours, the COD of the retentate had increased to 380,000. The COD of the permeate was 50,000.

In a second test, 5 kg of water and 840 g of 50% by weight sodium hydroxide were added to 2.5 kg of whole milk (fat content 3.5% by weight), followed by stirring for 4 hours at 80° C. The solution was made up to 40 liters with water. 200 g of disodium ethylenediamine tetraacetate were then added. The solution had a COD of 10,000. It was passed through the nanofiltration membrane with a temperature of 50° to 65° C.

For a temperature of 50° C. at the beginning of the filtration process, the membrane flow amounted to 30 L/hm$^2$; the permeate had a COD value of about 300. Over the first ten hours' filtration, the temperature of the solution was increased to 65° C. The membrane flow increased to 40 L/hm$^2$. The temperature was lowered to 60° C. and kept at that level for the remainder of the test. Over a total filtration time of 70 hours, the COD of the retentate increased to 30,000. The COD of the permeate was 1,000. On termination of the test, the membrane flow was 25 L/hm$^2$.

What is claimed is:

1. The process of cleaning processing equipment for beverages and foods consisting essentially of:
   (a) pumping a cleaning solution from its holding tank through said processing equipment in the absence of a pre-rinsing step;
   (b) collecting a first portion of said cleaning solution returning from said processing equipment into a recycling tank;
   (c) returning to the holding tank for said cleaning solution the main portion of the cleaning solution flowing through said processing equipment;
   (d) subjecting said first portion of said cleaning solution collected into said recycling tank to a separation process to provide a soil-rich concentrate and a low soil content regenerate;
   (e) transferring said regenerate to the holding tank for said cleaning solution;
   (f) disposing of said soil-rich concentrate as waste; and
   (g) rinsing said processing equipment with fresh water and delivering the rinse water to the holding tank for said cleaning solution to replace the volume of soil-rich concentrate removed in (d) and (f).

2. A process as in claim 1 wherein said first portion of said cleaning solution collected in step (b) comprises about 1% to 25% by volume of the total cleaning solution employed in the process.

3. A process as in claim 1 wherein said separation process in step (d) comprises a membrane separation process.

4. A process as in claim 3 wherein said membrane separation process is conducted by microfiltration, ultrafiltration, or nanofiltration.

5. A process as in claim 1 wherein said separation process in step (d) is continued until 60% to 95% by volume of said first portion of said cleaning solution has been obtained as a low soil content regenerate.

* * * * *